(12) United States Patent
Dirnberger et al.

(10) Patent No.: US 12,515,156 B2
(45) Date of Patent: Jan. 6, 2026

(54) AIR FILTER

(71) Applicant: MANN+HUMMEL GmbH, Ludwigsburg (DE)

(72) Inventors: Timo Dirnberger, Marbach (DE); Macario Francisco Dos Santos Ascensao, Moeglingen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 345 days.

(21) Appl. No.: 18/362,501

(22) Filed: Jul. 31, 2023

(65) Prior Publication Data

US 2024/0033667 A1 Feb. 1, 2024

(30) Foreign Application Priority Data

Jul. 29, 2022 (DE) .......................... 102022119072.2

(51) Int. Cl.
*B01D 46/00* (2022.01)
*B01D 46/12* (2022.01)
*B01D 46/52* (2006.01)
*B01D 46/62* (2022.01)

(52) U.S. Cl.
CPC ..... *B01D 46/0005* (2013.01); *B01D 46/0006* (2013.01); *B01D 46/0087* (2013.01); *B01D 46/12* (2013.01); *B01D 46/521* (2013.01); *B01D 46/62* (2022.01); *B01D 2265/025* (2013.01);
(Continued)

(58) Field of Classification Search
CPC ............ B01D 46/0005; B01D 46/0006; B01D 46/10; B01D 46/12; B01D 46/521; B01D 46/525–527; B01D 46/62; B01D 46/64; B01D 2265/025; B01D 2265/027; B01D 2265/028; B01D 2277/20; B60H 3/0616; B60H 3/0658; F02M 35/0216; F02M 35/02416
See application file for complete search history.

(56) References Cited

U.S. PATENT DOCUMENTS

| | | |
|---|---|---|
| 5,030,264 A | 7/1991 | Klotz et al. |
| 5,740,774 A | 4/1998 | Kennedy |
| 6,231,630 B1 | 5/2001 | Ernst et al. |

(Continued)

FOREIGN PATENT DOCUMENTS

| | | |
|---|---|---|
| DE | 2512724 A1 | 12/1976 |
| DE | 10347103 A1 | 6/2005 |

(Continued)

*Primary Examiner* — Robert Clemente

(57) ABSTRACT

An air filter has a filter housing with inlet opening, outlet opening, and service opening. A first filter element and a second filter element are arranged inside the filter housing between inlet opening and outlet opening. The first filter element is arranged in a mounting frame. The first and second filter elements can be flowed through serially in one or more operating states of the air filter. The mounting frame is insertable through the service opening into the filter housing in a joining direction and removable from the filter housing opposite to the joining direction. The second filter element has a wedge stop. A clamping wedge arranged at the mounting frame, upon insertion of the mounting frame into the filter housing, contacts the wedge stop of the second filter element and clamps the second filter element at the filter housing in a clamping direction transversely to the joining direction.

24 Claims, 5 Drawing Sheets

(52) U.S. Cl.
CPC .. *B01D 2265/027* (2013.01); *B01D 2265/028* (2013.01); *B01D 2277/20* (2013.01)

(56) References Cited

U.S. PATENT DOCUMENTS

| | | | |
|---|---|---|---|
| 7,597,735 B2 | 10/2009 | Terres et al. | |
| 7,972,405 B2 | 7/2011 | Engelland et al. | |
| 11,092,118 B2 | 8/2021 | Ruhland et al. | |
| 2003/0121242 A1 | 7/2003 | Rieger et al. | |
| 2004/0020177 A1 | 2/2004 | Ota et al. | |
| 2005/0229561 A1* | 10/2005 | Nepsund | B01D 46/0005 55/480 |
| 2007/0289265 A1* | 12/2007 | Coulonvaux | B01D 46/525 55/324 |
| 2008/0022641 A1* | 1/2008 | Engelland | B01D 46/88 55/521 |
| 2008/0110146 A1 | 5/2008 | Germain et al. | |
| 2008/0216455 A1 | 9/2008 | Aizawa et al. | |
| 2009/0320425 A1 | 12/2009 | Dworatzek et al. | |
| 2010/0050980 A1 | 3/2010 | Sasano et al. | |
| 2012/0216497 A1 | 8/2012 | Dworatzek et al. | |
| 2014/0033666 A1* | 2/2014 | Menssen | B01D 46/525 55/495 |
| 2014/0250843 A1* | 9/2014 | Krull | B01D 46/0005 55/357 |
| 2015/0107200 A1* | 4/2015 | Menssen | B01D 45/16 55/482 |
| 2016/0230716 A1* | 8/2016 | Finn | B01D 46/0005 |
| 2017/0095761 A1 | 4/2017 | Knight et al. | |
| 2017/0165600 A1 | 6/2017 | Ishikawa | |
| 2018/0339254 A1* | 11/2018 | Kaufmann | F02M 35/0201 |
| 2018/0345196 A1 | 12/2018 | Campbell et al. | |
| 2018/0363598 A1* | 12/2018 | Ruhland | B01D 46/0005 |
| 2021/0086121 A1* | 3/2021 | Campbell | B01D 46/10 |
| 2021/0121817 A1 | 4/2021 | Ichikawa et al. | |
| 2022/0274041 A1* | 9/2022 | Manley | B01D 46/10 |
| 2023/0175465 A1* | 6/2023 | Kaufmann | F02M 35/02433 55/482 |
| 2024/0033670 A1* | 2/2024 | Dirnberger | B01D 46/521 |

FOREIGN PATENT DOCUMENTS

| | | | |
|---|---|---|---|
| DE | 102013020653 A1 | 6/2015 | |
| DE | 102014012490 A1 * | 3/2016 | B01D 46/10 |
| DE | 102015006713 A1 | 3/2016 | |
| DE | 102016002037 A1 | 8/2016 | |
| DE | 102020107345 A1 | 9/2021 | |
| FR | 2896016 A1 | 7/2007 | |
| JP | S55164765 A2 | 12/1980 | |
| JP | S6067852 U | 5/1985 | |
| JP | H04118125 U | 10/1992 | |
| JP | H09122417 A | 5/1997 | |
| JP | H09234321 A | 9/1997 | |
| JP | H11132117 A | 5/1999 | |
| JP | 2001329921 A | 11/2001 | |
| JP | 2005036701 A | 2/2005 | |
| JP | 2021032196 A | 3/2021 | |
| KR | 101766126 B1 | 8/2017 | |
| WO | 9915776 A1 | 4/1999 | |

* cited by examiner

AIR FILTER

BACKGROUND OF THE INVENTION

The invention concerns an air filter with a first and a second filter element.

Such high-separation air filters are known to the applicant (but not necessarily published) and are used, for example, for filtering air for vehicle interiors.

The employed air filters typically comprise a filter element for pre-separation of coarse contaminants in the air to be filtered and a high-separation filter element, for example, a suspended particle filter, for separating smallest contaminants. The filter elements are therefore usually arranged inside the air filter such that first the filter element for pre-separation and subsequently the filter element for separation of smallest contaminants from the air to be filtered is flowed through.

For an exchange of the filter elements, the air filter often must be removed from the air guiding path in a complex manner. The labor expenditure for the exchange of the filter element increases thereby.

In order to counteract this disadvantage, some air filters have a lateral service opening which enables the exchange of the filter elements in the installed state of the air filter. The filter elements can be exchanged in these air filters through the lateral service opening transversely to a flow direction through the filter elements. The conventional systems are however suitable only to a limited extent in particular for use of a high-separation filter element. This is so because the employed filter elements have high requirements in regard to their sealing action in order to prevent bypassing of the filter element. For the lateral insertion of an exchanged filter element, in particular in case of a high-separation filter element, a required contact pressure of the filter elements between the filter elements as well as between the filter elements and/or the filter housing can be effected only insufficiently with the conventional systems. As a result, leakage flows inside the air filter can be produced that enable unfiltered air to bypass. Furthermore, these leakage flows can cause undesirable disturbing flow noises that reach the vehicle interior.

It is therefore object of the invention to propose an air filter in which the exchange of the filter element can be done quickly, simply, and at a high level of sealing action.

SUMMARY OF THE INVENTION

This object is solved by an air filter comprising:
a filter housing with a raw air-side inlet opening, a clean air-side outlet opening, and a closable service opening;
a first filter element and a second filter element arranged between the inlet opening and the outlet opening inside the filter housing;
a mounting frame in which the first filter element is received;
wherein the filter elements can be flowed through serially in at least one operating state of the air filter;
wherein the mounting frame can be removed through the service opening from the filter housing opposite to a joining direction and inserted in the joining direction into the filter housing;
wherein the mounting frame comprises a clamping wedge and the second filter element a wedge stop;
wherein the clamping wedge of the mounting frame upon insertion contacts the wedge stop of the second filter element and clamps the second filter element in this way in a clamping direction transversely to the joining direction at the filter housing.

The dependent claims provide preferred further embodiments.

An air filter is provided according to the invention. The air filter comprises a filter housing with a raw air-side inlet opening, at least one clean air-side outlet opening, and a closable service opening. The service opening is preferably configured to be air-tightly closable. The air filter comprises in addition a first filter element and a second filter element. The air filter can have three or more filter elements whereby the filtering action can be improved. Preferably, the air filter however has precisely two filter elements. The filter elements are arranged between the inlet opening and the at least one outlet opening inside the filter housing. The air filter comprises furthermore a mounting frame in which the first filter element is received. The filter elements can be flowed through in at least one operating state of the air filter serially or sequentially. In other words, the filter elements are arranged along a flow path of the air to be filtered through the filter housing. The mounting frame can be removed opposite to a joining direction through the service opening from the filter housing and can be inserted in the joining direction into the filter housing. Furthermore, the mounting frame comprises a clamping wedge. Furthermore, the second filter element comprises a wedge stop. Upon insertion of the mounting frame, the clamping wedge of the mounting frame contacts the wedge stop of the second filter element so that the second filter element is clamped at the filter housing in a clamping direction transversely to the joining direction.

The air filter according to the invention effects thus the particularly quick and simple exchange of the filter element via a lateral, in particular top-side, service opening. In this way, an exchange of the filter elements can be performed without removing the air filter from an air guiding system, for example, a system for venting a vehicle interior. Moreover, a clamping action of the filter elements transverse to the joining direction can be realized with the air filter according to the invention. In this way, pressure on the filter elements in clamping direction can be realized despite lateral insertion of the filter elements. In particular when using a high-separation filter element, for example, for venting of vehicle interiors, a contact pressure of the filter elements at the filter housing required for the sealing action can be effected in this way. The air filter according to the invention exhibits thus a particularly high sealing action between the filter elements and the filter housing and can effectively prevent leakage flows.

The joining direction is to be understood as a mounting direction of the filter elements in which the filter elements are inserted into the filter housing. The clamping direction is to be understood as an action direction of the clamping force which is effected by the clamping wedge and with which the mounting frame is clamped at the second filter element and at the filter housing and also the second filter element at the filter housing.

The clamping wedge comprises preferably a wedge angle. The wedge angle is measured between two wedge sides. One wedge side is typically oriented in joining direction in this context. The further wedge side can thus extend at the wedge angle at a slant to the joining direction. The wedge sides are preferably to be understood as the sections which are formed by the effective contact surfaces of the clamping wedge at the wedge stop and at the filter housing.

In a preferred embodiment of the air filter, the mounting frame can comprise a wedge counter stop at a side which is facing away from the clamping wedge. Preferably, the wedge counter stops are formed at the mounting frame. In a mounted state, the wedge counter stop can be supported at the filter housing so that a clamping force which is transmitted via the clamping wedge onto the second filter element can be diverted to the filter housing. The wedge counter stop is aligned preferably with the clamping wedge. In this way, the clamping force can be diverted particularly effectively.

The mounting frame can comprise two or more, in particular four, wedge counter stops. The wedge counter stops can be arranged locally spaced apart from each other at the mounting frame. In this way, the force diversion into the filter housing can be realized in a particularly targeted manner.

The filter housing can comprise a support surface. The support surface can be embodied for supporting the mounting frame. Preferably, the support surface contacts the wedge counter stops of the mounting frame. In this way, the force diverting locations at the filter housing can be matched to the wedge counter stops of the mounting frame.

In a particularly preferred embodiment, the support surface of the filter housing in connection with the wedge counter stop of the mounting frame forms a lock-and-key principle in the joining direction.

Furthermore, an embodiment of the air filter is preferred in which the clamping wedge comprises at least two clamping projections with a different projection height in the clamping direction. Preferably, the clamping wedge comprises at least three clamping projections. The clamping projections can be attached to or formed at the clamping wedge. Due to the clamping projections, the contact surface of the clamping wedge at the wedge stop can be predetermined, in particular reduced. In this way, the friction between the clamping wedge and the wedge stop can be reduced whereby the insertion of the mounting frame is facilitated. The wedge angle in this case can be formed between the joining direction and a straight line extending through the contact locations of the clamping projections at the wedge stop. The projection height can be understood as a protrusion of the clamping projections in the clamping direction past a common wedge base body.

Preferably, the clamping projections are spaced apart from each other in the joining direction.

A further development of the air filter is preferred in which the projection height of the clamping projections decreases in the joining direction. In other words, the projection height in the joining direction changes from a clamping projection to its neighboring clamping projection. The projection height of an individual clamping projection can be the same across its extension in the joining direction. In other words, it can be provided that the projection height at a clamping projection does not decrease in the joining direction. The clamping projections can form a stepped contact region at the clamping wedge.

Preferably, the wedge stop comprises a complementary contact surface. In particular, the wedge stop can have stepped sections in the joining direction at which a respective clamping projection of the clamping wedge rests. In this way, a lock-and-key principle can be embodied so that the insertion of a non-fitting or unsuitable filter element into the air filter can be prevented.

In a preferred embodiment of the air filter, the clamping wedge comprises at least two wedge faces. The wedge faces are in particular arranged at oppositely positioned sides of the mounting frame. Preferably, the wedge faces are embodied parallel to each other. In this way, the clamping force can be effected as symmetrically as possible on the second filter element so that a uniform pressing of the second filter element against the filter housing can be realized.

Preferred is a further embodiment of the air filter in which the wedge stop comprises at least two partial stops. Preferably, the at least two partial stops are arranged locally spaced apart from each other at the second filter element. Further preferred, the partial stops are arranged at oppositely positioned sides of the second filter element. This can further promote a symmetrical and uniform pressing of the second filter element against the filter housing. In a particular embodiment, the partial stops are formed at a frame of the second filter element. In this way, mounting can be simplified by reducing the number of individual parts.

In a preferred embodiment of the air filter, the clamping wedge projects past the mounting frame in the clamping direction. In other words, the clamping wedge projects in the direction toward the second filter element. In this way, a predetermined distance between the mounting frame and the second filter element can be adjusted.

For example, a volume to be flowed through between the first and the second filter element can be constructively provided in this way. Preferably, the clamping wedge overlaps the second filter element in the clamping direction. In this way, the wedge stop can be arranged particular easily at the second filter element. As an alternative or in addition, it can be provided that the wedge stop projects past the second filter element opposite to the clamping direction. In this case, a contact of the clamping wedge at the wedge stop can be realized, for example, between the first filter element and the second filter element. In this way, a loading as a result of the clamping force can be distributed uniformly onto clamping wedge and wedge stop.

In a preferred further embodiment of the air filter, it is provided that at least one wedge face of the clamping wedge is embodied to be fluid-permeable. In this way, a possible flow resistance due to the clamping wedge can be reduced.

Additionally preferred is a further embodiment of the air filter in which the wedge faces project differently far past the mounting frame in the clamping direction. In this way, the mounting frame and thus the filter element received therein can be arranged at a slant. This enables, on the one hand, the enlargement of the effective filter surface of the first filter element and, on the other hand, the improved flow through the volume formed between the first and the second filter element. In particular, the fluid-permeable wedge face projects farther past the mounting frame than another wedge face. In this way, the flow-through capability can be further increased. Furthermore, the slanted arrangement of the filter element facilitates providing a bypass switch element, as will be explained later on.

Preferred is furthermore an embodiment of the air filter in which the first filter element is arranged exchangeably at the mounting frame. The filter element is preferably received detachably at the mounting frame. In particular, the first filter element is inserted into the mounting frame. In this way, an exchange of the first filter element can be realized particularly easily and quickly. The filter element can comprise, for example, a pleated or folded filter medium.

An embodiment of the air filter is particularly preferred in which the mounting frame comprises a frame section which surrounds circumferentially the first filter element at the rim at least partially, wherein in particular the clamping wedge is formed at the frame section. Preferably, the frame section surrounds the filter element completely circumferentially. In this way, the filter element can be arranged loosely at the frame section so that an exchange can be realized particularly easily.

Preferably, the mounting frame comprises at least one support grid which is arranged in the frame section. The support grid can prevent the filter element received in the mounting frame from falling through. In this way, the filter element can be held captively at the mounting frame. Further preferred, the mounting frame comprises two support grids, wherein the filter element is arranged between the two support grids in the mounting frame. In this way, cleaning of the filter at the mounting frame can be enabled. Particularly preferred, at least one support grid is embodied so as to be detachable from the mounting frame so that an exchange of the filter element is enabled.

Further preferred is an embodiment of the air filter in which the first filter element and the second filter element are arranged parallel to each other in the mounted state. In this way, a uniform flow through the filter elements can be enabled. Alternatively, it can be provided that the first filter element and the second filter element are arranged in the filter housing at an angle relative to each other, in particular rotated at a predetermined angle in relation to the joining direction. In this way, the arrangement of the filter elements can be matched to their inflow and/or outflow.

In a preferred further embodiment of the air filter, it is provided that the mounting frame in the mounted state is arranged at an angle in relation to the second filter element in the filter housing, in particular rotated at a predetermined angle in relation to the joining direction. In this way, the position of the mounting frame can be adapted flexibly to the available installation space for the air filter.

Preferred is furthermore an embodiment of the air filter in which the service opening can be opened and closed by a hood. This enables the fast and simple access to the filter elements without demounting the air filter. Preferably, the hood is arranged, in particular fastened, at the mounting frame. In this way, the mounting frame can be removed simultaneously with the hood when opening the service opening.

Preferably, the service opening is configured for sequential removal, or removal one after another, of the filter elements through the service opening. In this way, the service opening can be kept small in respect to its dimensions.

In a preferred embodiment of the air filter, the second filter element is rotated by means of a hinge inside the filter housing into a fastening position and by means of a safety device, in particular a snap hook, pre-fastenable in the fastening position. Preferably, the hinge comprises hinge elements which can be detached from each other. For example, it can be provided that upon removal of the filter element a partial hinge element remains in the filter housing while another partial hinge element is removed together with the filter element. The hinge can then be formed by the partial hinge elements upon insertion of the filter element.

The fastening position is to be understood as a pre-positioning of the second filter element. By assuming the fastening position, the second filter element can be moved into a predetermined position in contact at the filter housing. When inserting the clamping wedge, a pressure application can thus be realized in a particularly controlled fashion. Furthermore, upon assuming the fastening position, the insertion space for the mounting frame can be enlarged so that the insertion can be realized more easily.

Particularly preferred is an embodiment of the air filter in which the air filter comprises a switchable bypass switch element which is present downstream of a filter element arranged upstream in the flow direction, wherein the bypass switch element is configured to effect in a first operating state a serial flow through both filter elements and, in a second operating state, an at least partial bypassing of the filter element arranged downstream.

In this way, the use of the filter elements can be controlled as needed. For example, it can be provided in an operating state that both filter elements are flowed through serially or sequentially in case the particle concentration in the air to be filtered is high. For low particle concentration, it can be provided in another operating state that one filter element is bypassed. In this way, the pressure loss caused by this filter element can be prevented and the energy input can be reduced. Furthermore, flow-caused disturbing noises can be reduced. Due to switching on and switching off the filter elements as needed, either the service life of the filter elements can be increased or the filter elements can be dimensioned smaller, which has a positive effect on the installation space requirement In a further preferred embodiment of the air filter, the at least one fluid-permeably designed clamping wedge face of the mounting frame provides a bypass flow path between the two filter elements. This enables the particularly low pressure loss bypassing of the filter element.

A further embodiment of the air filter is further preferred in which the air filter comprises a further outlet opening, wherein the further outlet opening is arranged at the outflow side of the first filter element, and wherein the further outlet opening can be opened and closed by the bypass switch element. In this way, a particularly effective bypassing of the filter element is enabled.

In a particularly preferred further embodiment of the air filter, the air filter comprises a clean air-side flow guide that connects in fluid communication the outlet openings at the downstream side. The flow guide comprises preferably a single air outlet. In this way, the connection of the air filter to an existing air duct can be realized particularly easily.

BRIEF DESCRIPTION OF THE DRAWINGS

Further features and advantages of the invention result from the following detailed description of embodiments of the invention, from the claims as well as with the aid of the Figures of the drawing illustrating details according to the invention. The aforementioned and still further explained features can be realized individually by themselves or several in arbitrary expedient combinations in variants of the invention. The features illustrated in the drawing are illustrated such that the particularities according to the invention can be made clearly visible.

DESCRIPTION OF PREFERRED EMBODIMENTS

Figure 1:
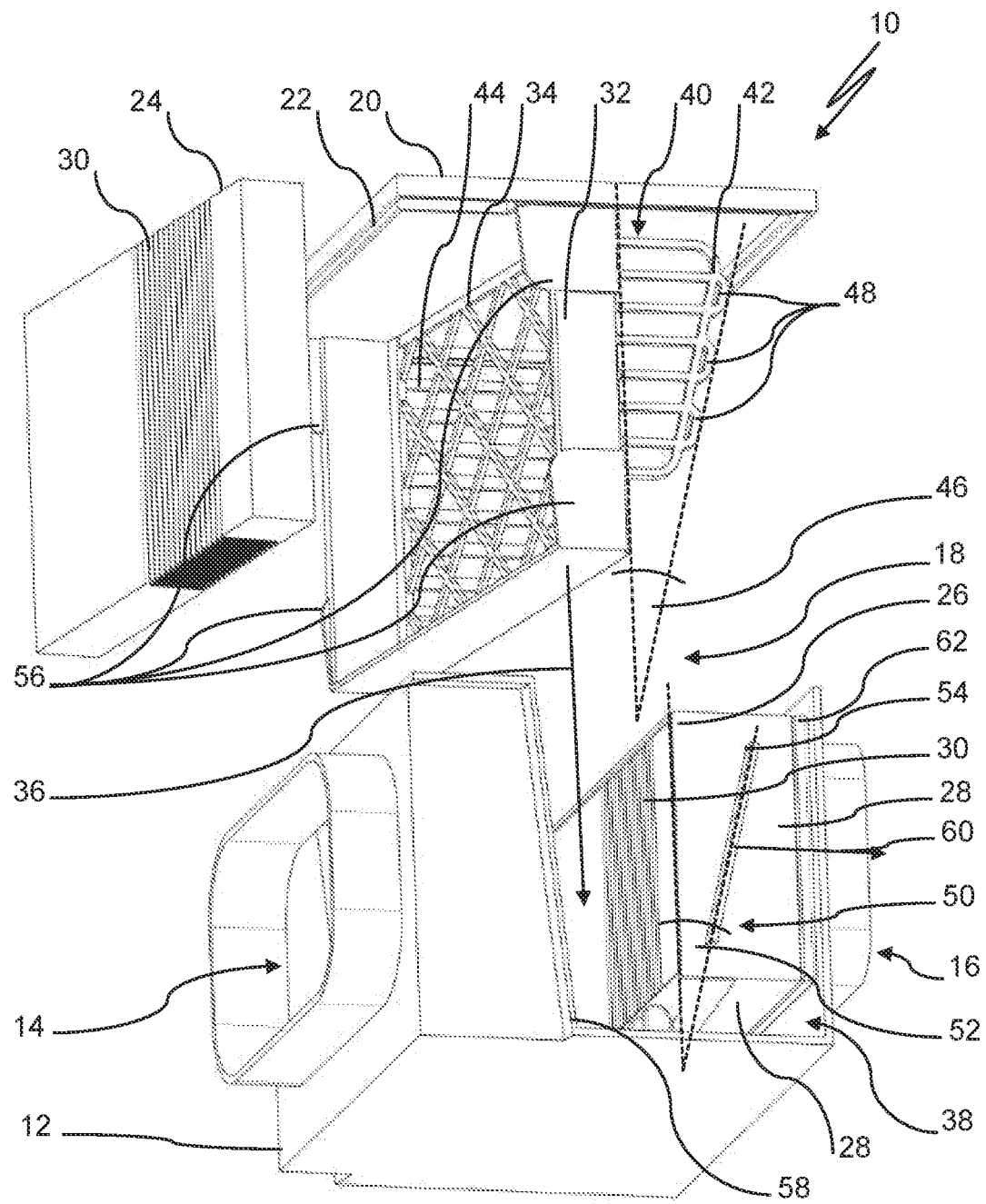
FIG. 1 shows a first embodiment of an air filter according to the invention in an unmounted state with a first filter element, a second filter element, and a mounting frame which comprises a clamping wedge with clamping projections.

FIG. 1 shows an air filter in an unmounted state. The air filter 10 comprises a filter housing 12 with a raw air-side inlet opening 14 and a clean air-side outlet opening 16. Furthermore, the filter housing 12 comprises a service opening 18 which can be closed by a hood 20. For this purpose, the hood 20 can comprise a seal means—here a circumferentially extending seal ring 22. The seal means can be arranged alternatively or additionally at the filter housing 12.

The air filter 10 comprises a first filter element 24 and a second filter element 26. The first filter element 24 and/or the second filter element 26 each can comprise a frame 28. According to the illustration in FIG. 1, a possible frame 28 at the first filter element 24 is not illustrated in detail. The filter elements 24, 26 each comprise, according to the shown illustration, a folded filter medium 30. For reasons of better illustration, only a partial region of the filter media 30 is illustrated in folds. In addition, further types of filter media can be provided.

The air filter 10 comprises furthermore a mounting frame 32. According to the shown illustration, the mounting frame 32 can be fastened at the hood 20, in particular so as to be nondetachable. Preferably, the hood 20 is formed at the mounting frame 32. In other words, the mounting frame 32 can be moved together with the hood 20. The mounting frame 32 can be designed in a U-shape, wherein the open side of the mounting frame 32 can be closed by the hood 20.

The mounting frame 32 is configured for receiving the first filter element 24. For this purpose, the mounting frame 32 can comprise a support grid 34. The support grid 34 is preferably arranged at the outflow side at the first filter element 24 and prevents the first filter element 24 from falling through the mounting frame 32. The mounting frame 32 supports the first filter element 24 thus at its circumference as well as at its filter surface. The support grid 34 comprises preferably a significantly higher air permeability compared to the first filter element 24. Particularly preferred, the support grid 34 is detachably arranged at the mounting frame 32. The support grid 34 however can also be one piece together with the mounting frame 32 or integrally formed thereat.

In a more special embodiment, it can be provided that a further support grid 34 can be arranged at the inflow side at the first filter element 24 received in the mounting frame 32. In other words, the first filter element 24 can be arranged so as to be received between two support grids 34 in the mounting frame 32. In this way, the first filter element 24 can be reliably prevented from falling out even in case of intensive cleaning measures.

The mounting frame 32 is removable together with the first filter element 24 arranged therein through the service opening 18 from the filter housing 12 as well as insertable in a joining direction 36 into the filter housing 12. In order to be able to explain better, the filter housing 12 has a partially cutaway region 38 which enables viewing the interior of the filter housing 12 but in actuality is however closed.

The mounting frame 32 comprises a clamping wedge 40. The clamping wedge 40 can comprise, as illustrated, a first wedge face 42 and a second wedge face 44. The second wedge face 44 is covered partially by the mounting frame 32 in the illustration. In the illustration according to FIG. 1, the clamping wedge 40 or each wedge face 42, 44 projects transversely past the mounting frame 32, in particular at a right angle, in relation to the joining direction 36.

The clamping wedge 40 or the wedge faces 42, 44 can be arranged or embodied non-detachably at the mounting frame 32. The clamping wedge 40 can comprise a wedge angle 46 which effects a wedge height tapering in the joining direction 36. In other words, the clamping wedge 40 opens in this case opposite to the joining direction 36. In a particular embodiment, it can be provided that the wedge faces 42, 44 each comprise a different wedge angle 46. In this way, the mounting safety can be increased.

The clamping wedge 40 can comprise clamping projections 48. According to the illustration, the first wedge face 42 has three clamping projections 48. The clamping projections 48 can form the contact surface of the clamping wedge 48 at a wedge stop 50. In other words, it can be provided that the clamping wedge 40 rests via the clamping projections 48 at the wedge stop 50.

The second filter element 26 comprises the wedge stop 50. The wedge stop 50 can be arranged or embodied at the second filter element 26. Preferably, the wedge stop 50 is arranged or embodied at the frame 28 of the second filter element 26. The wedge stop 50 comprises preferably a wedge stop angle 52 which is similar to the wedge angle 46, in particular identical.

The wedge stop 50 comprises furthermore preferably a number of partial stops 54 which corresponds to the number of wedge faces 42, 44. The partial stops 54 can be arranged or embodied locally spaced apart at the second filter element 26. Particularly preferred, the partial stops 54 are arranged or embodied at oppositely positioned sides of the second filter element 26. According to the illustration in FIG. 1, only one partial stop 54 is visible.

The mounting frame 32 can comprise wedge counter stops 56 at the side which is facing away from the clamping wedge 40. The wedge counter stops 56 can be configured for resting against a support region 58 of the filter housing 12.

When inserting the mounting frame 32 into the filter housing 12 along the joining direction 36, first the clamping wedge 40 contacts the wedge stop 50. Furthermore, the wedge counter stops 56 can come into contact with the housing-side support region 58. With increasing insertion of the mounting frame 32, the latter is supported at the filter housing 12 and effects a movement of the second filter element 26 in a clamping direction 60 by means of the clamping wedge 40 which is in contact with the wedge stop 50. The clamping direction 60 is effected transversely, in particular orthogonally, in relation to the joining direction 36. As a result, the second filter element 26 contacts on a side which is facing away from the clamping wedge 40 the filter housing 12 in an air-tight manner. The second filter element 26 comprises preferably a filter element seal 62 which is arranged between the second filter element 26 and the filter housing 12. According to the illustration, the filter element seal 62 is captively arranged or fastened at the second filter element 26. Furthermore, it can be provided that the filter element seal 62 is captively arranged or fastened at the filter housing 12.

In other words, it is constructively provided that, prior to the insertion of the mounting frame 32, a spatial demand of the mounting frame 32 in the joining direction 60 is larger than the space which is available between the support region 58 and the wedge stop 50. By insertion of the mounting frame 32, the second filter element 26 is displaced by being pressed by the mounting frame 32 and the clamping wedge 40 against the filter housing 12 in the clamping direction 60. The filter element seal 62 can be compressed in this context.

Figure 2:
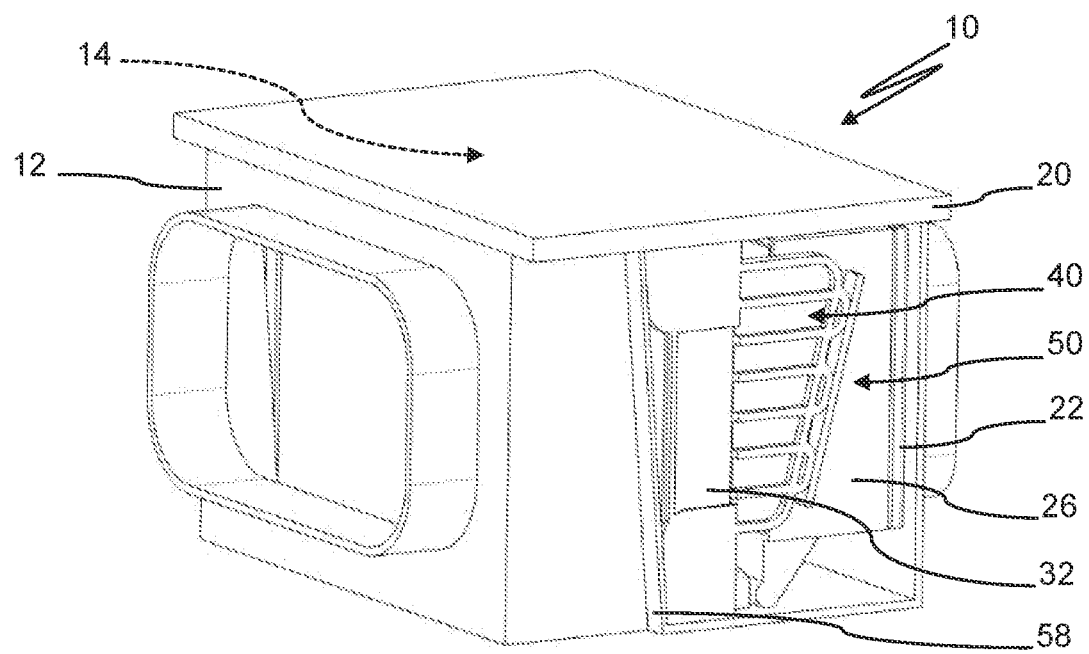
FIG. 2 shows the air filter of FIG. 1 in a mounted state in which the clamping projections of the clamping wedge contact a wedge stop.

FIG. 2 shows the air filter 10 in a mounted or closed state. The hood 20 closes the service opening 14, in particular air-tightly. The service opening 14, as illustrated, is covered by the hood 20 and is therefore provided with a dashed arrow.

According to the illustration in FIG. 2, the mounting frame 32 is inside the filter housing 12. The clamping wedge 40 rests against the wedge stop 50 and clamps the mounting frame 32 at the support region 58, on the one hand, and the second filter element 26 at the filter housing 12, on the other hand.

Figure 3:
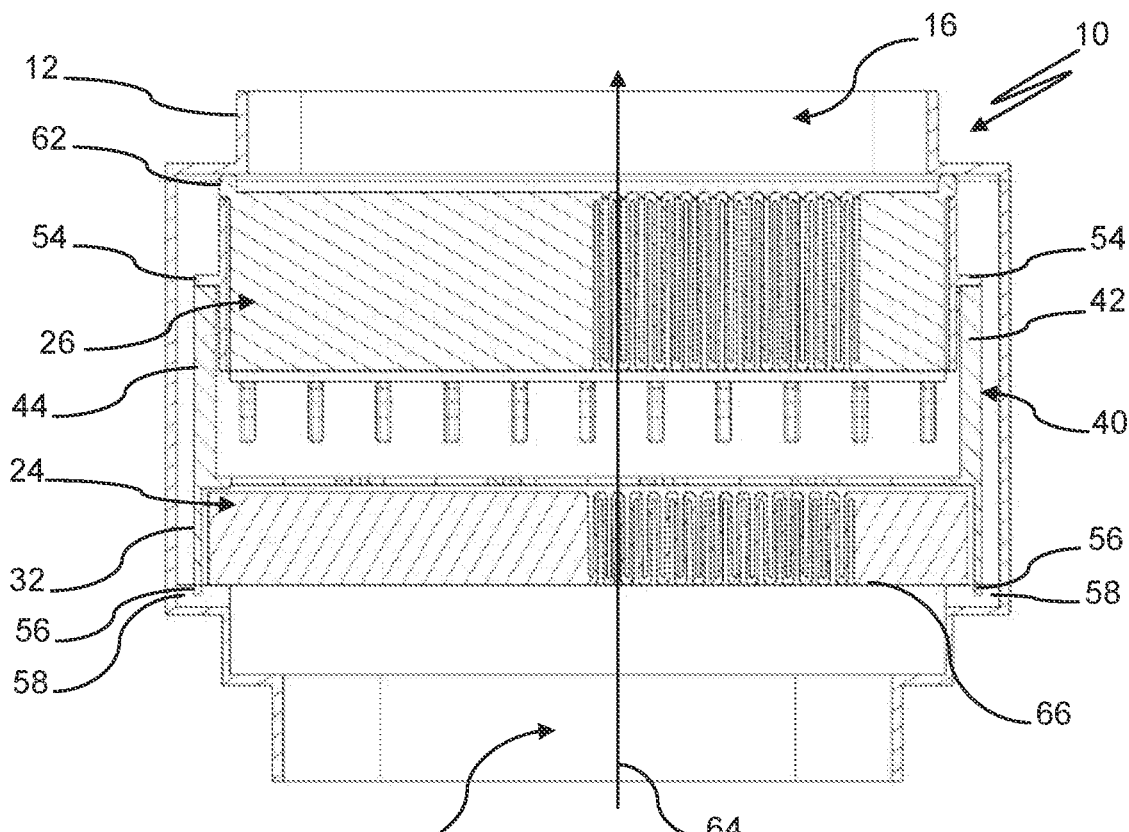
FIG. 3 shows the air filter of FIG. 2 in the mounted state in a sectioned plan view.

FIG. 3 shows the air filter 10 in the mounted state in a sectioned plan view. The first filter element 24 and the second filter element 26 are fluidically connected in series. In other words, the second filter element 26 is downstream of the first filter element 24 along an exemplary flow path 64 which extends from the inlet opening 14 to the outlet opening 16. Air to be filtered which can pass through the inlet opening 14 into the filter housing 12 is first filtered by the first filter element 24 and subsequently by the second filter element 26 prior to exiting the filter housing 12 through the outlet opening 16.

The illustration shows the two wedge faces 42, 44 of the clamping wedge which are resting against the two partial stops 54. According to the illustration, the partial stops 54 are formed at oppositely positioned sides of the second filter element 26. In addition, the wedge faces 42, 44 according to the embodiment in FIG. 3 are formed at oppositely positioned sides of the mounting frame 32.

The filter housing 12 comprises no partially cutaway region 38 (see FIG. 1). In other words, the filter housing 12 comprises in the illustrated embodiment only the inlet opening 14 and the outlet opening 16 as air passage.

The first filter element 24 can cover, in particular completely, the inlet opening 14 with an inflow side 66. In order to effectively prevent bypassing the first filter element 24, it can be provided that the mounting frame 32 rests against the support region 58. In particular, the support region 58 and/or the wedge counter stops 56 can comprise a seal means. Alternatively or additionally, it can be provided that the mounting frame 32 comprises a seal means at the hood 20 (see FIGS. 1, 2) which rests against the filter housing 12 in an inserted state of the mounting frame 32.

Figure 4:
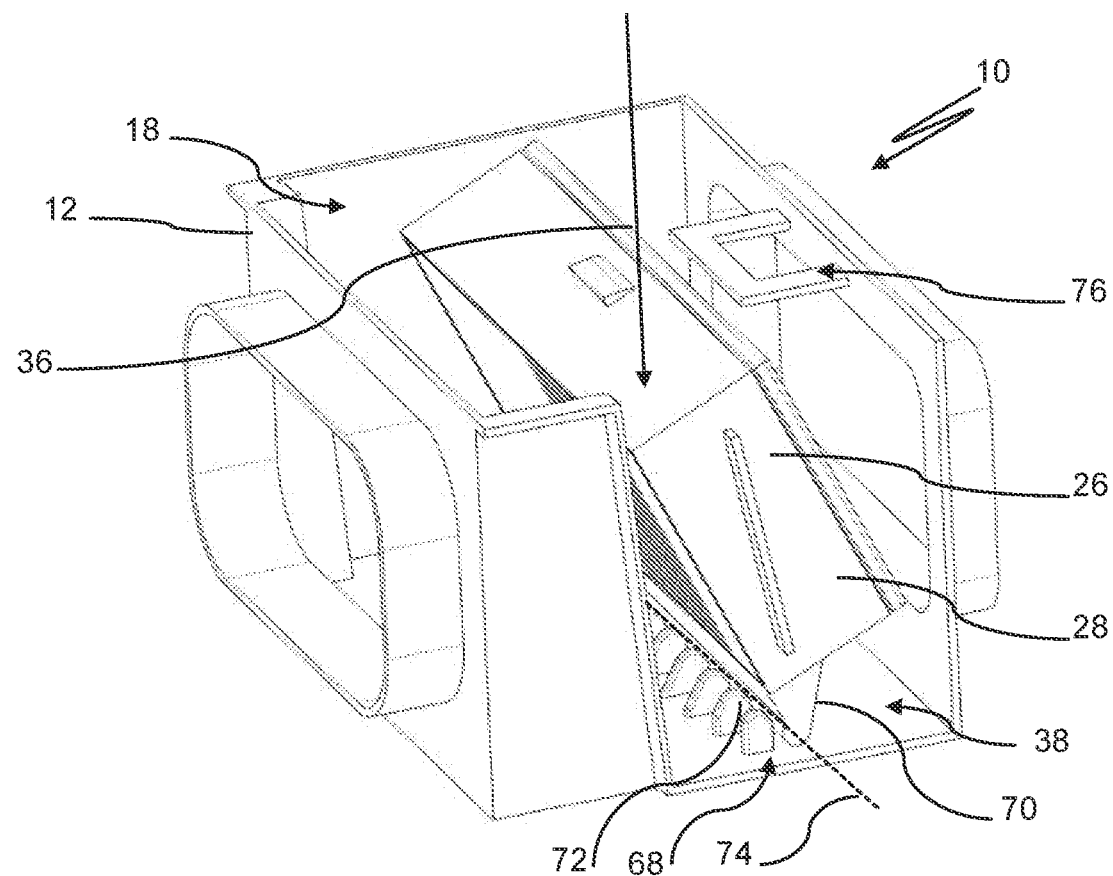
FIG. 4 shows the air filter of FIG. 1 in a state with partially inserted second filter element.

FIG. 4 shows the air filter 10 in an unmounted state without the mounting frame 32 (see FIGS. 1-3) and the hood 20 (see FIGS. 1-3). In order to be able to better explain the illustration, the illustration comprises the partially cutaway region 38.

According to the illustration in FIG. 4, the air filter 10 can be in a servicing and/or mounted state. In this context, it can be provided that the second filter element 26 is inserted before the first filter element 24 (see FIGS. 1-3) or the mounting frame 32 into the filter housing 12. Due to such a sequential mounting of the filter elements 24, 26, the service opening 18 can be kept smaller with respect to its dimensions compared to simultaneous mounting.

For this purpose, it can be provided that the second filter element 26 by means of a hinge 68 can be rotated into a fastening position. The hinge 68 can comprise according to the Figure a lever 70 arranged or formed at the frame 28 of the second filter element 26 and a rotary stop 72 arranged or formed at the filter housing 12 which form a rotational axis 74 for the second filter element 26 when connected. The rotary stop 72, as illustrated, can be embodied in the form of a plurality of rib-shaped projections.

After insertion of the second filter element 26 in the joining direction 36 into the filter housing 12, the second filter element 26 then can be rotated about the rotational axis 74 into the fastening position. In other words, the filter element 26 after insertion can be rotated out of the insertion region of the mounting frame 32. Subsequently, the filter element 26 by means of a safety device 76—here a snap hook—can be held in the fastening position. This can effectively prevent a return rotation of the second filter element 26 into the insertion region of the mounting frame 32 (see FIG. 1).

In the fastening position, pre-clamping of the second filter element 26 with the filter housing 12 can be realized. Pre-clamping favors the circumferential contact of the second filter element 26 at the filter housing 12 so that a particularly good clamping action is enabled after insertion of the first filter element 24.

Figure 5:
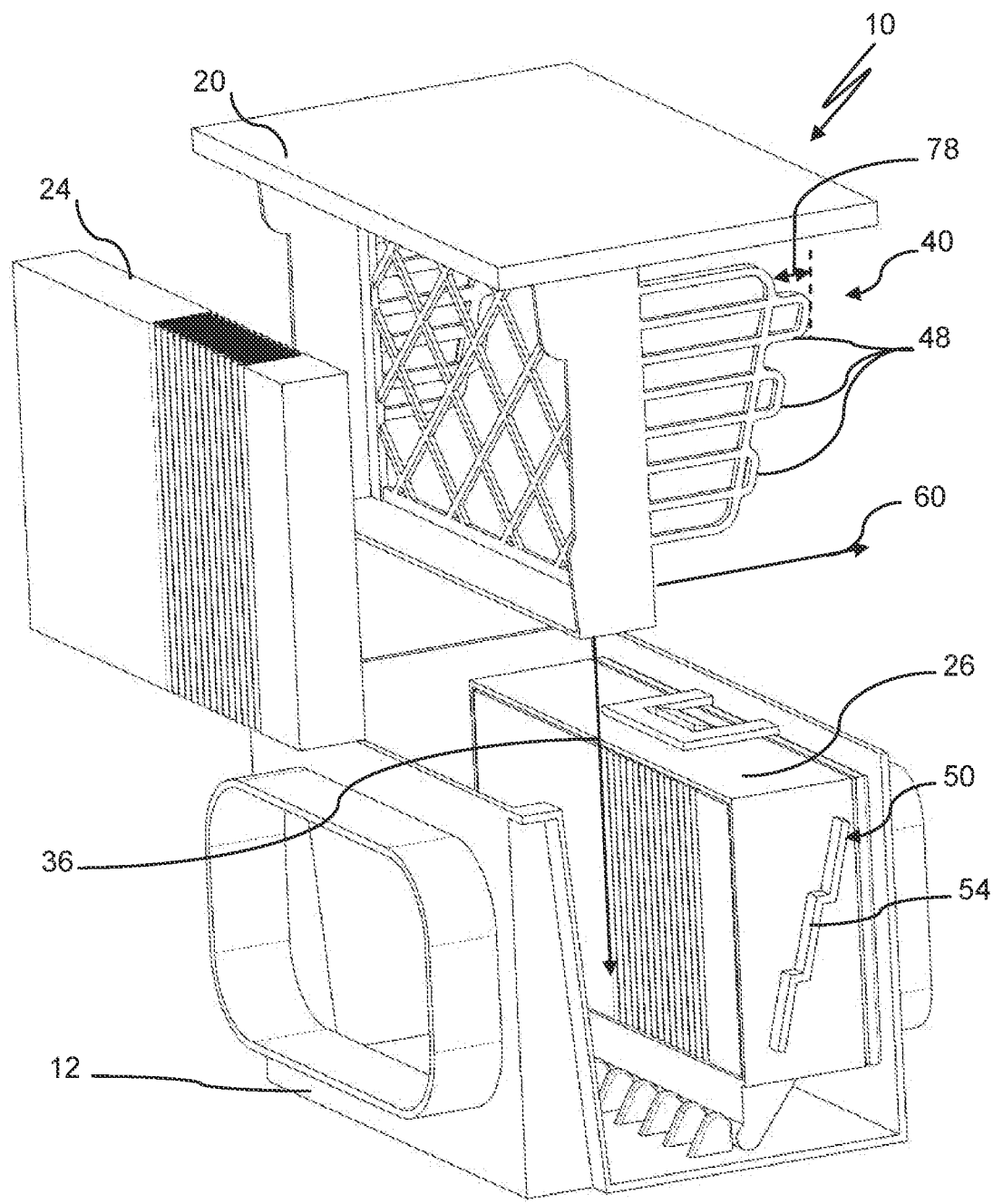
FIG. 5 shows a second embodiment of an air filter in an unmounted state with a clamping wedge which comprises different projection heights and a wedge stop embodied complementary to the clamping wedge.

FIG. 5 shows a second embodiment of an air filter 10. The illustrated air filter 10 differs from the embodiment illustrated in FIGS. 1-4 by a changed configuration of the clamping wedge 40 and of the wedge stop 50.

The clamping wedge 40 comprises according to this embodiment a plurality—here three—clamping projections 48. The clamping projections 48 comprise in the clamping direction 60 a projection height 78, wherein the projection height 78 of neighboring clamping projections 48 decreases in the joining direction 36. In other words, the contact surface of the clamping wedge 40 can be designed in a stepped manner.

The partial stops 54 of the wedge stop 50, as illustrated, can also be of a stepped design. Upon insertion of the mounting frame 32 into the filter housing 12 along the joining direction 36, the clamping projections 48 contact the respective step section of the contact surface 54 which is formed complementary to this clamping projection 48. In this way, it can be effected that according to the lock-and-key principle only filter elements 24, 26 which are matched to each other can be inserted together into the filter housing 12. Mounting errors can be prevented.

Figure 6:
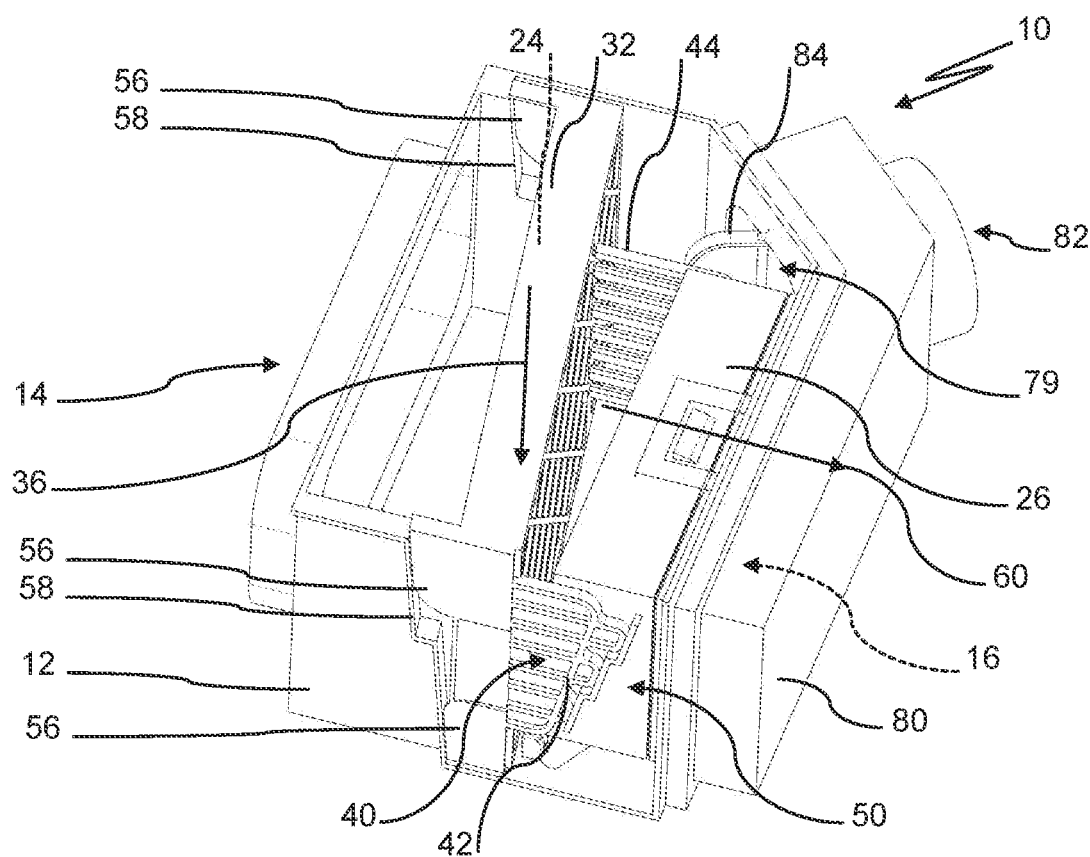
FIG. 6 shows a third embodiment of an air filter with a mounting frame arranged at a slant, a bypass switch element, and a fluid-permeably embodied wedge face of the clamping wedge.

FIG. 6 shows a third embodiment of the air filter 10 in a mounted state of the mounting frame 32 without the hood 20 (see FIGS. 1, 2, 5). The illustrated air filter 10 comprises in the filter housing 12 an inlet opening 14, an outlet opening 16 as well as a further outlet opening 79. The outlet opening 16 according to the illustration in FIG. 6 is covered by an air collection strip 80. The air collection strip 80 can connect the outlet opening 16 and the further outlet opening 79 in fluid communication. Preferably, the air collection strip 80 comprises a single air outlet 82. In this way, the integration of the air filter 10 in an air guiding channel (not illustrated) can be simplified.

The further outlet opening 79 is preferably formed downstream of the first filter element 24 and upstream of the second filter element 26 at the filter housing 12. In other words, the second filter element 26 can be bypassed via the further outlet opening 79. The further outlet opening 79 comprises preferably a switchable bypass switch element 84—here in the form of a bypass control flap. In this way, the further outlet opening 79 can be opened and/or closed in a controlled manner. This enables, as needed, the controlled bypassing of the second filter element 26.

The clamping wedge 40 comprises the first wedge face 42 and the second wedge face 44. The wedge faces 42, 44 are positioned at corresponding contact surfaces 54 of the wedge stop 50. In the illustrated embodiment, the wedge face 44 is embodied to be fluid-permeable, here air-permeable, in order to improve bypassing of the second filter element 26 when the bypass switch element 84 is opened.

According to a further feature to be independently considered, the wedge face 44 in the clamping direction 60 projects farther past the mounting frame 32 than the first wedge face 42. This enables the arrangement of the first filter element 24 in the filter housing 12 rotated about the joining direction 36. In other words, the first filter element 24 and the second filter element 26 are positioned at a slant relative to each other. In this way, the size of the mounting frame 32 and thus of the first filter element 24 can be enlarged. In addition, the flow cross section between the first filter element 24 and the second filter element 26 can be enlarged, which simplifies flow through the filter housing 12.

According to the embodiment illustrated in FIG. 6, the support region 58 at the filter housing 12 can be of a stepped design. In other words, in a manner analog to the clamping wedge 40 and the wedge stop 50, a lock-and-key principle can be provided at the support region 58. The mounting frame 32 can provide wedge counter stops 56 matched to the support region 58. In this way, the mounting safety can be further increased.

Figure 7:
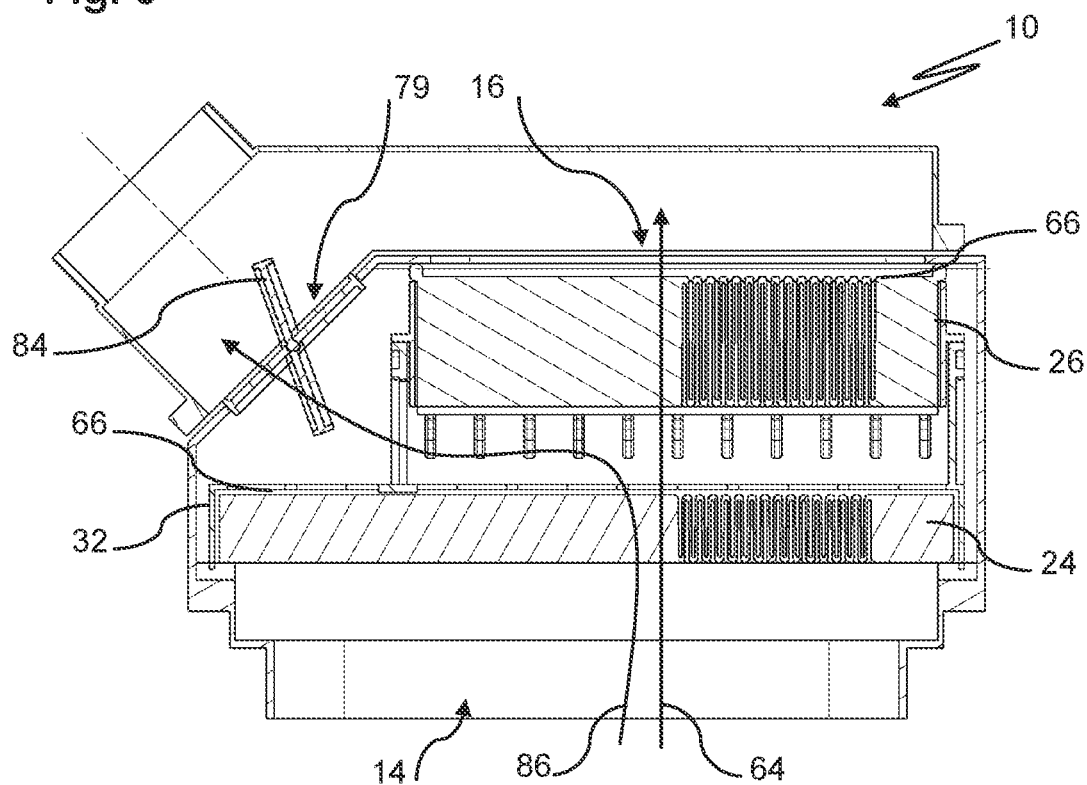
FIG. 7 shows a fourth embodiment of an air filter with parallel arranged filter elements and a bypass switch element in a sectioned plan view.

FIG. 7 shows a fourth embodiment of an air filter 10 in a sectioned plan view. The first filter element 24 or the mounting frame 32 is arranged clamped inside the filter housing 12 parallel to the second filter element 26.

The filter housing 12 comprises an inlet opening 14, an outlet opening 16, and a further outlet opening 79. The outlet opening 16 is formed at the outflow side 66 of the second filter element 26 in the filter housing 12. The further outlet opening 79—connected in fluid communication to the outflow side 66 of the first filter element 24—is formed between the first and the second filter element 24, 26 at the filter housing 12.

The further outlet opening 79 comprises the bypass switch element 84.

With the bypass switch element 84 closed, the flow through the air filter 10 is realized according to the flow path 64 shown in an exemplary fashion. Along the flow path 64, air entering the air filter housing 12 is filtered by means of the two filter elements 24, 26. In this way, air with a high particle concentration can be effectively filtered.

In case of a minimal particle concentration in the air to be filtered, it can be provided that the bypass switch element 84 is opened and air is guided along the flow path 86, shown in an exemplary fashion, through the air filter housing 12. With the bypass switch element 84 opened, the air which has been filtered by the first filter element 24 can bypass the second filter element 26 through the further outlet opening 79. In this way, the air filter 10 exhibits a reduced pressure loss which is beneficial with respect to energy input.

LIST OF REFERENCE CHARACTERS liquid filter 10
filter housing 12
raw air-side inlet opening 14
clean air-side outlet opening 16
service opening 18
hood 20
seal ring 22
first filter element 24
second filter element 26
frame 28
filter medium 30
mounting frame 32
support grid 34
joining direction 36
partially cutaway region 38
clamping wedge 40
first wedge face 42
second wedge face 44
wedge angle 46
clamping projection 48
wedge stop 50
wedge stop angle 52
partial stop 54
wedge counter stop 56
support region 58
clamping direction 60
filter element seal 62
flow path 64
inflow side 66
hinge 68
lever 70
rotary stop 72
rotational axis 74
safety action 76
projection height 78
further outlet opening 79
air collection strip 80
air outlet 82
bypass switch element 84
flow path 86

What is claimed is:
1. An air filter comprising:
a filter housing comprising an inlet opening at a raw air side, a first outlet opening at a clean air side, and a closable service opening;
a first filter element and a second filter element, the first filter element and the second filter element arranged inside the filter housing between the inlet opening and the first outlet opening;
a mounting frame, wherein the first filter element is arranged in the mounting frame;
wherein the first filter element and the second filter element are configured to be flowed through serially in one or more operating states of the air filter;
wherein the mounting frame is insertable through the service opening into the filter housing in a joining direction and is removable from the filter housing opposite to the joining direction;
wherein a clamping wedge is arranged at the mounting frame;
wherein the second filter element comprises a wedge stop;
wherein the clamping wedge arranged at the mounting frame, upon insertion of the mounting frame into the filter housing, contacts the wedge stop of the second filter element and clamps the second filter element at the filter housing in a clamping direction transversely to the joining direction.
2. The air filter according to claim 1, wherein the mounting frame comprises a wedge counter stop arranged at a side of the mounting frame facing away from the clamping wedge, wherein the wedge counter stop is supported at the filter housing in a mounted state of the mounting frame in the filter housing so that a clamping force transmitted via the clamping wedge to the second filter element is diverted to the filter housing.

3. The air filter according to claim 1, wherein the clamping wedge comprises at least two clamping projections, each having a different projection height in the clamping direction.

4. The air filter according to claim 3, wherein the projection heights of the at least two clamping projections decrease in the joining direction and wherein the wedge stop comprises stepped sections in the joining direction, wherein the at least two clamping projections each rest at one of the stepped sections, respectively.

5. The air filter according to claim 1, wherein the clamping wedge comprises at least two wedge faces, wherein the wedge faces are arranged at oppositely positioned sides of the mounting frame.

6. The air filter according to claim 5, wherein the clamping wedge projects past the mounting frame in the clamping direction.

7. The air filter according to claim 6, wherein the at least two wedge faces of the clamping wedge include a fluid-permeable wedge face.

8. The air filter according to claim 7, wherein the fluid-permeable wedge face projects farther past the mounting frame in the clamping direction than another one of the at least two wedge faces.

9. The air filter according to claim 5, wherein the at least two wedge faces project differently far past the mounting frame in the clamping direction.

10. The air filter according to claim 5, wherein the wedge stop comprises two locally spaced apart partial stops, wherein the two locally spaced apart partial stops are arranged at oppositely positioned sides of the second filter element.

11. The air filter according to claim 1, wherein the first filter element is arranged exchangeably at the mounting frame.

12. The air filter according to claim 1, wherein the mounting frame comprises a frame section surrounding the first filter element at a rim side thereof at least partially circumferentially.

13. The air filter according to claim 12, wherein the clamping wedge is formed at the frame section.

14. The air filter according to claim 1, wherein, in a mounted state of the first filter element and of the second filter element in the filter housing, the first filter element and the second filter element are arranged in the filter housing parallel to each other or at an angle relative to each other.

15. The air filter according to claim 14, wherein the first filter element and the second filter element are arranged rotated relative to each other at a predetermined angle in relation to the joining direction.

16. The air filter according to claim 1, wherein, in a mounted state of the mounting frame in the filter housing, the mounting frame is arranged in the filter housing at an angle in relation to the second filter element.

17. The air filter according to claim 16, wherein the mounting frame is rotated at a predetermined angle in relation to the joining direction.

18. The air filter according to claim 1, further comprising a hood configured to open or close the service opening, wherein the hood is arranged at the mounting frame.

19. The air filter according to claim 1, wherein the second filter element is configured to rotate about a hinge into a fastening position inside the filter housing and wherein a safety device pre-fastens the second filter element in the fastening position.

20. The air filter according to claim 19, wherein the safety device is a snap hook.

21. The air filter according to claim 1, further comprising a switchable bypass switch element arranged downstream of the first filter element, wherein the first filter element is arranged upstream of the second filter element in a flow direction, wherein the bypass switch element is configured to effect, in a first one of the one or more operating states of the air filter, a serial flow through the first filter element and the second filter element and further configured to effect, in a second one of the one or more operating states of the air filter, an at least partial bypassing of the second filter element.

22. The air filter according to claim 21, wherein the clamping wedge comprises at least two wedge faces and wherein the at least two wedge faces include a fluid-permeable wedge face, wherein the fluid-permeable wedge face provides a bypass flow path between the first filter element and the second filter element.

23. The air filter according to claim 21, comprising a second outlet opening arranged at an outflow side of the first filter element, wherein the second outlet opening is openable and closable by the switchable bypass switch element.

24. The air filter according to claim 23, comprising a flow guide arranged at the clean side, wherein the flow guide is an air collection strip connecting the first outlet opening and the second outlet opening in fluid communication to each other.

\* \* \* \* \*